United States Patent
Sigel et al.

(10) Patent No.: US 10,051,003 B2
(45) Date of Patent: Aug. 14, 2018

(54) PRIVACY ENHANCEMENTS FOR WIRELESS DEVICES

(71) Applicant: Apple Inc., Cupertino, CA (US)

(72) Inventors: Aaron M. Sigel, San Francisco, CA (US); Andrew R. Whalley, San Francisco, CA (US); Awartika Pandey, Saratoga, CA (US); Robert J. Walsh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 14/933,709

(22) Filed: Nov. 5, 2015

(65) Prior Publication Data

US 2017/0034215 A1 Feb. 2, 2017

Related U.S. Application Data

(60) Provisional application No. 62/199,143, filed on Jul. 30, 2015.

(51) Int. Cl.
  *H04L 29/06* (2006.01)
  *H04W 12/02* (2009.01)
  (Continued)

(52) U.S. Cl.
  CPC .......... *H04L 63/20* (2013.01); *H04L 63/107* (2013.01); *H04L 63/108* (2013.01); *H04W 12/02* (2013.01);
  (Continued)

(58) Field of Classification Search
  None
  See application file for complete search history.

(56) References Cited

U.S. PATENT DOCUMENTS 7,636,338 B1 * 12/2009 Vu .......................... H04L 63/08
                                                                    370/338
8,989,205 B2 * 3/2015 Campos ................ H04J 3/1647
                                                                    370/431
(Continued)

FOREIGN PATENT DOCUMENTS

JP      2005065018 A    3/2005
JP      2009-182391     8/2009
(Continued)

OTHER PUBLICATIONS

Notice of Preliminary Rejection dated Mar. 22, 2017 in Korean Patent Application No. 10-2016-0097044. 11 pages (English translation provided).

(Continued)

*Primary Examiner* — Malcolm Cribbs
(74) *Attorney, Agent, or Firm* — Kilpatrick Townsend & Stockton, LLP

(57) ABSTRACT

A wireless device can obtain a network information record from another device operating as a credential source. The network information record can include network access information for a wireless network (e.g., SSID and password) and a usage policy specifying conditions under which the wireless device should search for the wireless network (e.g., temporal and/or spatial conditions). The wireless device can implement the usage policy by searching for the wireless network only when the conditions are satisfied. In some instances, the network access information can include instructions for dynamically generating time-varying network access information, and the wireless device can use the instructions to generate network access information during a search for wireless networks.

18 Claims, 7 Drawing Sheets

(51) Int. Cl.
    *H04W 12/08*     (2009.01)
    *H04W 48/16*     (2009.01)
    *H04W 12/04*     (2009.01)

(52) U.S. Cl.
    CPC ........... *H04W 12/08* (2013.01); *H04W 48/16* (2013.01); *H04W 12/04* (2013.01)

(56) References Cited

U.S. PATENT DOCUMENTS

| | | | | |
|---|---|---|---|---|
| 9,661,566 | B2* | 5/2017 | Hedberg | H04W 48/20 |
| 2005/0050318 | A1 | 3/2005 | Alone et al. | |
| 2005/0120119 | A1* | 6/2005 | Bhanu | H04W 8/005 |
| | | | | 709/229 |
| 2006/0056634 | A1* | 3/2006 | Lee | H04L 63/20 |
| | | | | 380/270 |
| 2007/0067309 | A1* | 3/2007 | Klein, Jr. | G06F 17/30017 |
| 2007/0115899 | A1* | 5/2007 | Ovadia | H04W 36/24 |
| | | | | 370/338 |
| 2009/0045943 | A1* | 2/2009 | Chen | H04L 63/0853 |
| | | | | 340/539.11 |
| 2010/0211785 | A1* | 8/2010 | Park | H04L 29/1232 |
| | | | | 713/168 |
| 2012/0093031 | A1* | 4/2012 | Wang | H04L 29/06 |
| | | | | 370/254 |
| 2012/0254451 | A1* | 10/2012 | Kimura | H04W 48/14 |
| | | | | 709/228 |
| 2013/0014232 | A1 | 1/2013 | Louboutin et al. | |
| 2013/0176984 | A1* | 7/2013 | Koezuka | H04B 11/00 |
| | | | | 370/329 |
| 2013/0200606 | A1* | 8/2013 | Omar | B41M 3/14 |
| | | | | 283/74 |
| 2013/0297730 | A1* | 11/2013 | Zhang | H04W 48/08 |
| | | | | 709/217 |
| 2014/0071854 | A1* | 3/2014 | Xiang | H04W 48/16 |
| | | | | 370/254 |
| 2014/0194086 | A1* | 7/2014 | Alam | H04W 52/0254 |
| | | | | 455/405 |
| 2014/0199996 | A1* | 7/2014 | Wang | H04W 36/14 |
| | | | | 455/426.1 |
| 2014/0237559 | A1* | 8/2014 | Zhang | H04W 12/04 |
| | | | | 726/4 |
| 2014/0337950 | A1* | 11/2014 | Yang | H04W 12/08 |
| | | | | 726/7 |
| 2014/0357228 | A1* | 12/2014 | Luft | H04B 7/0456 |
| | | | | 455/411 |
| 2015/0082399 | A1 | 3/2015 | Wu et al. | |
| 2015/0117424 | A1* | 4/2015 | Jeong | H04W 48/16 |
| | | | | 370/338 |
| 2015/0163625 | A1* | 6/2015 | Saida | H04W 48/16 |
| | | | | 455/456.1 |
| 2015/0189547 | A1* | 7/2015 | Forssell | H04L 63/101 |
| | | | | 370/235 |
| 2015/0195710 | A1* | 7/2015 | Bar-Niv | H04W 12/08 |
| | | | | 726/23 |
| 2015/0319686 | A1* | 11/2015 | Hedberg | H04W 48/20 |
| | | | | 370/329 |
| 2016/0066252 | A1* | 3/2016 | Parron | H04W 48/16 |
| | | | | 455/434 |
| 2016/0219050 | A1* | 7/2016 | Zou | H04L 63/0869 |
| 2016/0267729 | A1* | 9/2016 | Baumgarte | H04W 12/06 |

FOREIGN PATENT DOCUMENTS

| | | |
|---|---|---|
| KR | 2013-0054387 A | 5/2013 |
| KR | 1020140088354 A | 10/2014 |

OTHER PUBLICATIONS

Aruba Networks, "Data Sheet ClearPass Onboard a ClearPass Policy Manager Application." Apr. 8, 2015. 4 pages.

GitHub—carltonwhitehead/wifi-auto-forget: "Automatically forget unwanted Wi-Fi networks from your Android Device." Aug. 12, 2014. 1 page.

Aruba Networks, "Solution Overview the ClearPass Policy Management Platform." Jun. 8, 2015 4 pages.

Notice of Allowance dated Nov. 23, 2017 in Korean Patent Application No. 10-2016-0097044. 8 pages (includes English translation of the claims).

* cited by examiner

PRIVACY ENHANCEMENTS FOR WIRELESS DEVICES

CROSS-REFERENCE TO RELATED APPLICATIONS

This application claims the benefit of U.S. Provisional Application No. 62/199,143, filed Jul. 30, 2015, the disclosure of which is incorporated by reference herein in its entirety.

BACKGROUND

This disclosure relates generally to devices that are capable of connecting to and communicating via wireless networks, and in particular to privacy enhancements for such devices and networks.

Wireless networks have become commonplace. Many individuals have established such networks in their homes for use by residents and guests. Business enterprises large and small provide wireless networks for their employees and/or visitors, and many business establishments that serve the public (e.g., coffee shops, hotels, conference venues, and the like) offer wireless network connections to their patrons. Such networks typically conform to with Wi-Fi® networking standards and protocols promulgated by the Wi-Fi Alliance (referred to herein as "Wi-Fi networks").

Wireless networks such as Wi-Fi networks can be accessed using a wireless device, which can be any electronic device that is capable of sending and receiving data using the wireless transport and signaling protocols specified for the network. In a Wi-Fi network protocol, a wireless device can locate a base station for a wireless network using a process referred to as scanning Scanning can include passively listening on allowed wireless channels for beacon signals from base stations that are broadcasting a network name (e.g., a "service set identifier," or "SSID"). Some networks may be "hidden," such that the base station does not broadcast a network name. In that case, the wireless device can perform an active scan, in which the wireless device broadcasts a beacon signal that includes the network name (e.g., SSID), and a base station that has that network name can respond to the wireless device to allow the wireless device to detect that the network is present.

Once a desired network has been detected, the wireless device can send a request to join the network, which the base station can either grant or deny. For example, in the case of a secure network, the base station may require the wireless device to prove that it is in possession of an access credential (e.g., a password, security certificate, or the like) and may deny access to any wireless device that cannot provide the required proof Open networks may allow any wireless device to join the network without any particular credential, subject only to constraints on available resources (e.g., a limit on the number of devices that can be concurrently connected). Once joined (or connected) to the network, the wireless device can communicate with the base station and with any other device or system to which the base station is connected. For instance, many wireless base stations operate as access points for accessing a wide-area network, such as the Internet. Thus, by joining a wireless network, a wireless device is able to provide Internet access to a user. In combination with mobile user devices such as smart phones, tablet computers, and laptop computers, wireless networks offer the convenience of access to the world's leading repository of information (the Internet) from virtually anywhere.

SUMMARY

Wireless networks tend to be local in nature. Thus, as a user travels from place to place with a wireless device, the device may join a number of different wireless networks at different times. Rather than requiring the user to remember the various networks and their access credentials (e.g., passwords), many wireless devices keep track automatically. For instance, the wireless device can scan for networks in a given area (e.g., using passive scanning) and present a list of the network names (or SSIDs) that it finds to the user. The user can select a network to join. As another example, in some instances, the user can manually input a network name as an alternative to selecting from a list, and the wireless device can perform an active or passive scan for that specific network name. This can allow the device to locate hidden networks of which it might otherwise be unaware. Once a network is found, the device can prompt the user for an access credential (e.g., password) if one is needed. After joining a particular network for the first time, the wireless device can persistently store a network information record that includes the SSID and any associated access credential, and stored network information records can be used when the device subsequently searches for wireless networks. This is referred to as "remembering" a network, and a network for which a network access record is persistently stored in the device is said to be "known" to the wireless device.

Some wireless devices can be configured to automatically join known networks whenever a known network is detected. For instance, the device can actively and/or passively scan for base stations, and if it finds a base station with an SSID that matches a known network, it can automatically send a request to join the network, using a stored access credential. In addition or instead, some wireless devices can be configured to automatically detect known networks and alert the user to the option to join.

In the course of attempting to locate or join a wireless network, a user device may broadcast the network names (e.g., SSIDs) of one or more networks that it knows. These broadcasts are sent in the clear and susceptible to eavesdropping by any device in the vicinity that has a suitably configured receiver. From the set of SSIDs that a given wireless device broadcasts, it may be possible to infer information about the device or its user. For instance, an SSID may be unique to a particular venue (e.g., a specific hotel in Miami), and the eavesdropper can infer that the user has been at that venue from the fact that the wireless device is broadcasting that SSID. Further, even if a given SSID is not unique (over a large geographical area), if the wireless device broadcasts multiple SSIDs, the eavesdropper may be able to use the combination of SSIDs to determine information such as where the user likely lives or who the user is (e.g., based on a combination of SSIDs associated with specific venues or regions). Even in instances where the user is not identified, a "fingerprint" defined by broadcast SSIDs can be used to track a particular device.

In addition, a wireless device that broadcasts SSIDs may be susceptible to spoofing attacks, in which an impersonator (which can be any device other than the actual base station of the network) responds as if it were the base station. The impersonator may be able to trick the wireless device into exposing a user's personal data or otherwise compromising user privacy.

Certain embodiments of the present invention relate to privacy enhancements for wireless devices. For example, in some embodiments, a wireless device operated by a user can obtain a network information record from a trusted "credential source." In some embodiments, the credential source can be a docking station in a specific location (e.g., a hotel room) to which the user can physically connect a wireless device for the purpose of communicating a network information record (and optionally other information). In some embodiments, the credential source can be a short-range wireless transceiver device (e.g., a device supporting Bluetooth® Classic, Bluetooth® Smart, or near-field communication (NFC) protocols) with which the user's device can communicate to obtain a network information record (and optionally other information). In still other embodiments, the credential source can include a server or the like that generates a message containing the network information record and sends the message to the user's device on a secure channel (e.g., using a secure data connection or as an encrypted message on an open network or the like).

The network information record can include a network name (e.g., SSID) and any required access credential (e.g., password, security certificate), and can also include a data object defining a usage policy governing use of the network information record. The usage policy can specify when and/or where the network information record should be used. For example, a usage policy can specify an expiration time, after which the user device should stop using the network information record (and optionally discard it), and/or a start time, before which the user device should not attempt to access the identified network. Thus, for example, if a user is staying in a hotel for particular time period, the operator of the hotel can provide the user with a network information record that has a start time and/or expiration time coincident with the beginning and/or end of the user's stay. While the user is staying at the hotel, the user's device can remember the hotel's network and automatically attempt to join it; when the user's stay ends, the user's device can stop automatically attempting to join the hotel's network. In some embodiments, the device can also delete the network information record from persistent storage, thereby "forgetting" the network.

In addition or instead, a usage policy can specify a timeout period, e.g., a "join timeout" or a "visibility timeout," after which the user's device should stop using the network information record (and optionally forget the network). In the case of a join timeout, the timeout can be based on the elapsed time since the device last joined the network (e.g., stop using the record if the network has not been joined for three days). In the case of a visibility timeout, the timeout can be based on the elapsed time since the device last found the network during a scan, regardless of whether the device joined the network at that time.

In addition or instead, a usage policy can specify a geofence, such that the user device should only use the network information record with a defined geographic area. For instance, a geofence can be specified by providing terrestrial coordinates (e.g., latitude and longitude) and a radius for the defined geographic area. The area can be defined to encompass the area within which the wireless network is expected to be usable or detectable, with optionally some margin around it. The user device can use an onboard Global Positioning System (GPS) receiver or the like to determine its current location and whether that location is inside or outside the geofence specified in the network information record. If the device is outside the geofence, the device can temporarily ignore the network information record but continue to remember the network. If the device is inside the geofence, it can look for the network. Thus, for instance, the user device can remember a network for a hotel where the user stays from time to time but not look for that network unless the user is at or near the hotel.

In some embodiments, the network information record for a particular network can specify a static network name (e.g., SSID) and access credential (e.g., password), e.g., using character strings. Alternatively, it may be desirable for the network name and/or access credential to be time-varying. For example, a base station for a Wi-Fi network can implement an algorithm that changes the SSID and/or password at regular time intervals (e.g., every day, every three hours, weekly) using an iterative algorithm and a seed. If the SSID and password are both dynamic, the same algorithm or different algorithms can be used for each, and the time interval at which the SSID and password change can be the same or different. Where a dynamic SSID and/or password are in use, the network information record provided to the wireless device from the credential source can include instructions for computing the currently valid values. The instructions can include, for example, the algorithm (or an identifier of an algorithm) and any inputs (e.g., a seed or other initial value) or other information (e.g., an iteration rule defining when to iterate the algorithm) that the wireless device would need to generate an SSID and/or password that matches the currently valid SSID and/or password generated at the base station. When scanning for networks, the wireless device can carry out the instructions to determine the current SSID for the network and/or to determine the current password if the SSID of the network is found.

It should be noted that a dynamic SSID and/or password can be used in a network information record either with or without additional usage policies as described herein, and additional usage policies can be used with either static or dynamic SSID and/or password.

The following detailed description together with the accompanying drawings will provide a better understanding of the nature and advantages of the present invention.

DETAILED DESCRIPTION

Figure 1:
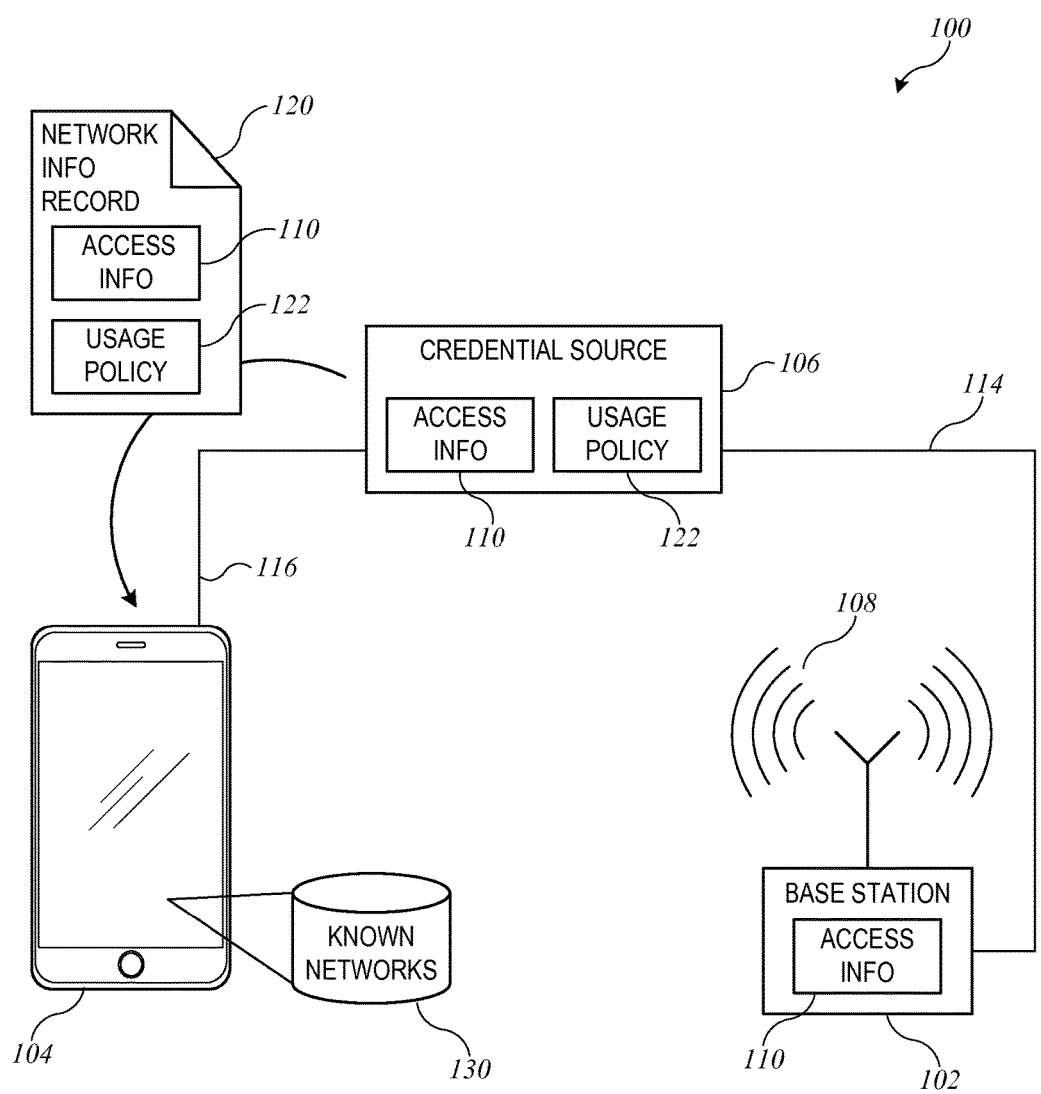
FIG. 1 shows a system according to an embodiment of the present invention.

FIG. 1 shows a system 100 according to an embodiment of the present invention. System 100 can include a wireless network base station 102, a wireless device 104, and a credential source 106. Base station 102 can operate as a base station for a wireless network 108, which can be, e.g., a network that complies with Wi-Fi® networking standards and protocols promulgated by the Wi-Fi Alliance (referred to herein as a "Wi-Fi network"). For example, base station 102 can facilitate wireless communication between wireless device 104 and any other devices (not shown) that have joined network 108. In some embodiments, base station 102 can provide an access point for a wide-area network such as the Internet, allowing wireless device 104 to communicate with any Internet-enabled electronic device or system via wireless network 108.

Base station 102 can maintain network access information 110 for wireless network 108. Network access information 110 can include, e.g., a network name and valid access credential(s) for accessing wireless network 108. The network name can be, e.g., a service set identifier (SSID) as used in Wi-Fi networks. An access credential can include, e.g., a password, pass phrase, access key, digital certificate, or other item of information that can be used to provide proof to base station 102 that a particular wireless device (e.g., wireless device 104) has been authorized to join wireless network 108. (The proof can include, e.g., a cryptographic proof of possession of a shared secret, with the access credential functioning as at least a portion of the shared secret.) In some embodiments, multiple network names and/or access credentials may be concurrently valid. Any type of wireless network or base station can be used in connection with embodiments of the present invention.

Wireless device 104 can be an electronic device that is capable of communicating via wireless network 108. As used herein, a "wireless device" can include any type of electronic device that is capable of joining a wireless network. Examples include desktop or laptop computers, tablet computers, smart phones, other mobile phones, wearable devices (e.g., watches, head-mounted displays, etc.), media devices (e.g., devices capable of delivering media content from local and/or remote sources to a display and/or speakers), household appliances (e.g., clothes washers, dishwashers, refrigerators, stoves, heating/cooling systems, etc.), environmental control devices (e.g., thermostats, light fixtures, electrical switches), security devices (e.g., door locks, door openers, cameras, motion sensors, etc.), and so on.

In order to access wireless network 108, wireless device 104 needs to obtain network access information 110. In some embodiments, network 108 may be a "non-hidden" network, meaning that base station 102 periodically broadcasts a beacon that includes the network name (e.g., SSID). In that case, wireless device 104 can obtain the network name from the broadcast. If network 108 is a "hidden" network, then base station 102 does not broadcast the network name. In that case, wireless device 104 needs to obtain the network name from another source and broadcast the network name; base station 102 can detect and respond to the broadcast, thereby allowing wireless device 104 to detect the network. Further, regardless of whether network 108 is hidden or non-hidden, network 108 might or might not be a "secure" network, where "secure" in this context refers to a wireless network that requires a device to prove possession of a valid access credential as a precondition of joining or rejoining the network. To join a secure network 108, wireless device 104 also needs to obtain the access credential, which can be done, e.g., by prompting the user to provide it. Assuming the user knows the access credential, the user can enter it, and wireless device 104 can use the network name and access credential to join wireless network 108.

In some embodiments, rather than relying on user input, wireless device 104 can obtain network access information 110 via credential source 106. Credential source 106 can be an electronic device that is able to obtain network access information 110 from base station 102. For example, credential source 106 can maintain or intermittently establish a communication link 114 to base station 102. Depending on implementation, link 114 can be a wireless link (via wireless network 108 or a different network) or a different communication medium (e.g., an Ethernet connection or other wired network connection), and base station 102 can provide network access information 110 (including any updates or modifications that may occur) to credential source 106 via communication link 114. In some embodiments, network access information 110 can be provided to credential source 106 through a path other than communication link 114. For instance, a network manager (a person) who establishes or modifies network access information 110 at base station 102 may also provide the same network access information 110 to credential source 106, e.g., via a user interface or via a transmission sent to both base station 102 and credential source 106. The particular manner in which credential source 106 obtains network information 110 is irrelevant to other operations described herein, and any desired technique can be used.

Credential source 106 can also be configured to establish a communication link 116 to wireless device 104. Communication link 116 can be used to transmit a network information record 120 that includes network info 110 to wireless device 104. Link 116 generally would not be established via wireless network 108, since it is assumed that wireless device 104 would not yet have the information needed to join wireless network 108. However, any other communication channel, including a different wireless network (for which wireless device 104 already has the network access information), can be used. For example, credential source 106 can be implemented in a docking device (e.g., a speaker dock or clock radio dock or the like) to which wireless device 104 can be connected via a connector or cable, thereby providing a direct wired communication link 116 using a point-to-point protocol such as USB or UART or the like. As another example, credential source 106 can implement a short-range wireless communication protocol such as Bluetooth® communication protocols and standards promulgated by the Bluetooth SIG (including Bluetooth® Classic and/or Bluetooth® Smart communication protocols, referred to collectively herein as "Bluetooth communication") and/or a near-field communication (NFC) protocol. Assuming wireless device 104 supports the same protocol, link 116 can be an NFC or Bluetooth communication link. Other communication protocols and mediums can be used. Communication link 116 can be a short-term connection and need only persist long enough to transfer network information record 120 to wireless device 104.

In other embodiments, credential source 106 can be configured to send network information record 120 to wireless device 104 using a messaging technology such as email, SMS ("short messaging service," also referred to as text messaging), or the like. For example, suppose that wireless network 108 operates in a hotel. Credential source 106 can be implemented in a server system operated by an operator of the hotel. When the user makes a reservation at the hotel, credential source 106 can generate a network information record 120 and send it in an email message, text message, or other message to the user of wireless device 104. The user of wireless device 104 can operate wireless device 104 to store the received network information record 120 in a data store 130 as part of a set of network information records for known networks. Alternatively, in some embodiments, wireless device 104 can be configured to recognize network information record 120 in an incoming message (e.g., email or text message) and can either automatically store network information record 120 in known networks data store 130 or prompt the user to confirm that network information record 120 should be so stored. Other techniques can also be used. For instance, wireless device 104 can provide an application that maintains various "passes" for the user (e.g., virtual credit cards, loyalty rewards cards, boarding passes, theater tickets, etc.), and network information record 120 can be formatted as a pass that can be loaded into the application. Such passes can be delivered, e.g., via email, SMS, download from a website, or other communication channels as desired.

According to certain embodiments of the present invention, credential source 106 can provide a usage policy 122 as part of network information record 120. As described below, usage policy 122 can specify a set of one or more conditions under which wireless device 104 should attempt to use network access information 110 to join network 108. Examples of such conditions can include a start date (e.g., do not use network access information 110 prior to a certain date or time), an end date (e.g., do not use network access information 110 after to a certain date or time), a timeout condition (e.g., do not use network access information 110 if network 108 has not been joined or is not visible for a longer than a specified time period), and/or a geofence (e.g., do not use network access information 110 except within a specified geographical area). Wireless device 104 can implement control logic, e.g., as described below, to limit the circumstances and conditions under which wireless device 104 attempts to join wireless network 108 in accordance with usage policy 122.

In some embodiments, after receiving network information record 120, wireless device can store network information record 120, including network access information 110 and usage policy 122, in known networks data store 130. The known networks can include any wireless network(s) that wireless device 104 has previously joined, regardless of how the network information for the network in question was acquired by wireless device 104. For any given network, the stored network information record can include the network access information (e.g., SSID and password) and might or might not also include a usage policy, depending on whether a usage policy for the network access information has been provided to wireless device 104. As described below, when searching for networks to join, wireless device 104 can apply the usage policy (if any) defined for each known network, allowing wireless device 104 to apply different usage policies to different known networks. Thus, after receiving network information record 120, wireless device 104 can use network access information 110 to join wireless network 108 at any time when the condition(s) specified by usage policy 122 are satisfied.

It will be appreciated that system 100 is illustrative and that variations and modifications are possible. Any number of disparate types of wireless devices can be connected to a wireless network, and devices can drop off and rejoin the network at any time. A wireless network can include a single base station device or multiple discrete base station devices that can communicate with each other, e.g., to seamlessly extend the coverage area of a particular wireless network. A single credential source can be used to provide network information records to any number of wireless devices. In addition or instead, multiple credential sources can be associated with a single wireless network. While Wi-Fi networks are used as an example, the particular networking technologies and protocols can be varied, and the invention is not limited to Wi-Fi networks. For example, a credential source can provide other credentials or access information, such as a credential for a network-enabled entertainment system in a hotel or AV equipment in a conference room.

In some embodiments, policy information and network access information (e.g., passwords or other access credentials) can be provided separately, and different communication channels can be used. For instance, usage policy 122 can be included in a beacon sent by a base station of a wireless network, allowing wireless devices that connect to the network to obtain usage policy information for network 108 independently of the manner in which the devices obtain the network access credentials for network 108. Further, since a beacon would be detected each time wireless device 104 attempts to join network 108, including usage policy 122 in a beacon can allow the operator of network 108 to promulgate updates to the usage policy to wireless devices that already have network access information.

Network access information 110 can include any information usable by wireless device 104 to join wireless network 108. In some embodiments, the network information can include a network name (e.g., SSID) and an access credential (e.g., password). Where network access information 110 is provided by credential source 106, it may be possible to take advantage of the machine-to-machine communication to enhance security and/or privacy of a wireless network.

For example, it is common for operators of Wi-Fi networks to assign SSIDs that are easily recognized by a user (e.g., "Firm$_{13}$Guest" or "HotelCalifornia"). This is considered useful in part because joining a particular Wi-Fi network, at least for the first time, typically entails user participation. For instance, when a wireless device locates an unknown wireless network, the device may present the SSID to the user and prompt the user to indicate whether the network should be joined, or the device may prompt the user to enter the access credential for the SSID. In some cases (e.g., hidden networks), the user may also need to enter the SSID for the network, and this can be another reason for using user-friendly SSIDs.

However, even if the network is hidden, a wireless network name is not really a secret: the name of a network can be broadcast by one or both of the base station (in the case of a non-hidden network) or wireless devices trying to join the network (in the case of a hidden network), and any other wireless device in range of the broadcast can receive and interpret it. Thus, for example, third parties may learn that a particular wireless device is broadcasting, or that it recognizes, a particular SSID. Depending on the SSID, this can provide information as to where the device has been and/or who its user is. Consequently, user-friendly network names may compromise privacy to at least some extent.

Providing network information 110 to wireless device 104 via credential source 106 can reduce or eliminate the reasons for user-friendly SSIDs, which can enhance privacy for the user and/or the network operator, as the network operator can choose SSIDs that are not easy for human beings to recognize. It can also reduce the temptation of network operators to choose passwords that are easy for users to remember and/or enter into their devices. Easy-to-enter passwords are often also easy for unauthorized users to guess; thus, improved network security may also be achieved through using more difficult (for human beings) passwords. Provided that wireless device 104 has the network access information required to join wireless network 108, the user does not need to be able to read the information or enter it anywhere. This can allow additional privacy and/or security features, examples of which are described below.

Figure 2:
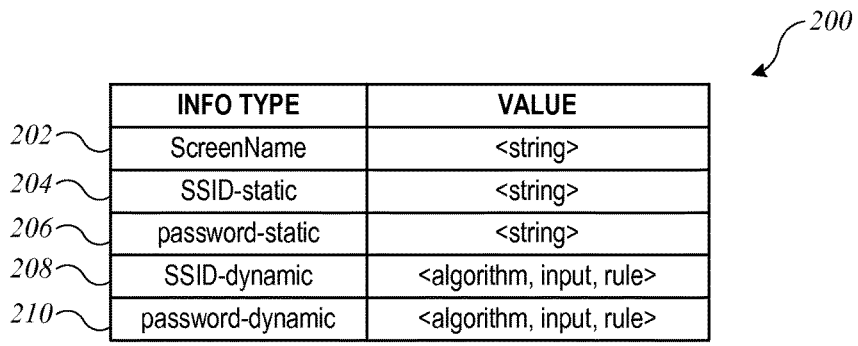
FIG. 2 shows a table of information items that can be included in network access information according to an embodiment of the present invention.

FIG. 2 shows a table 200 of information items that can be included in network access information 110 according to an embodiment of the present invention. It is to be understood that network access information 110 for a given network can include some or all of the information items shown and may include information items other than those shown. In some embodiments, any or all of the information in table 200 can be provided to wireless device 104 by credential source 106, eliminating the need for the user to enter network information manually.

Screen name 202 can be a user-friendly name associated with wireless network 108. Screen name 202 can be uncorrelated with the SSID (or other broadcast network name) for wireless network 108. In some embodiments, screen name 202 can be used by wireless device 104 when it presents prompts or other information to the user, but need not be transmitted or broadcast by wireless device 104 to any other device. For example, in any user interface display where wireless device 104 would ordinarily present the SSID for a wireless network, in the case of network information record 110, wireless device 104 can instead (or in addition) present screen name 202, on the assumption that the user will find screen name 202 more meaningful than the SSID.

SSID-static field 204 and password-static field 206 can be populated with static character strings that are usable as the SSID and password for wireless network 108. Wireless device 104 can use the string stored in SSID-static field 204 to detect wireless network 108 (e.g., using active or passive scanning) and, when wireless network 108 is detected, wireless device 104 can use the string stored in password-static field 206 to join. It should be understood that other network names and access credentials can be used, depending on the particular wireless protocol.

Some embodiments can also support dynamic SSID and/or password generation. As used herein, a "dynamic" SSID or password can be a character string or other identifier that is generated algorithmically such that the SSID or password is a function of time. For example, a dynamic SSID or password can be generated using an algorithm that is iteratively executed at regular intervals (e.g., daily, weekly, hourly, etc.), starting from an initial seed at a specified initial time. As another example, a dynamic SSID or password can be generated by executing an algorithm on a time-dependent input (e.g., executing a hash function on a date string representing today's date). Base station 102 can implement dynamic SSID and/or password access. For example, a network operator can configure base station 102 to execute a suitable algorithm to generate a currently valid SSID and/or password. At any given time, only wireless devices that have the currently valid SSID and/or password are permitted to join wireless network 108.

Where base station 102 implements dynamic SSID and/or password access, instead of static character strings, network access information 110 can include instructions for computing the SSID and/or password. For instance, SSID-dynamic field 208 and password-dynamic field 210 can each include parameters specifying an algorithm to use, any input parameters required, and other information such as an iteration rule. Suitable algorithms include any deterministic algorithm that can be executed iteratively (i.e., using the output of one instance of execution as input for the next instance) to produce a sequence of outputs, so that given a starting value and a number of iterations, any computer that executes the algorithm will reliably produce the same result. For security purposes, particularly useful algorithms have the further property that their next output is unpredictable absent knowledge of the algorithm being used, the starting seed, and the schedule. For example, an algorithm can use a pseudorandom number generator that is iteratively executed in combination with a conversion algorithm to generate a character string from the output of the pseudorandom number generator. Numerous other examples of suitable algorithms are known in the art and can be used in connection with dynamic SSID and/or password generation.

Depending on implementation, dynamic SSID and password fields 208, 210 can include actual program code for the algorithm or a reference identifying a specific algorithm in a library of algorithms assumed to be accessible to wireless device 104. Dynamic SSID and password fields 208, 210 can also include a seed or any other input parameters needed to start execution, as well as a rule specifying a start time and when each iteration should be performed (e.g., a rule such as "starting Jul. 1, 2015, iterate daily at midnight"). Based on the rule, wireless device 104 can determine the number of iterations to perform at any given time to obtain the current value.

In various embodiments, different combinations of static and dynamic network information can be used. For example, the SSID can be static while the password is dynamic, or vice versa, or both can be static, or both can be dynamic. Where dynamic network access information 110 is used, base station 102 can be configured such that any devices that are connected to network 108 when an update occurs can remain connected for at least some period of time after the update without having to reauthorize. This can provide a more seamless user experience, particularly when the dynamic network access information is frequently updated. In addition, a wireless device 104 that is connected to network 108 that uses dynamic network access information can implement various techniques to optimize a transition to new network access information.

It will be appreciated that table 200 is illustrative. More or fewer information types can be defined, and not all information types need be populated for any given wireless network. For instance, it is contemplated that when network information record 120 is received by wireless device 104, one or the other of SSID-static field 204 or SSID-dynamic field 208 would be populated (and similarly for password-static field 206 and password-dynamic field 208). Use of screen name 202 is optional but can help to decouple the SSID and password from anything the user is expected to read or type.

Regardless of whether they are static or dynamic, the SSID and password can be arbitrary character strings. Where wireless device 104 obtains these character strings from credential source 106, the user does not need to read or type them. Further, user-friendly screen name 202 can be assigned to network 108 so that the user sees screen name 202 instead of (or, if desired, in addition to) the SSID. Consequently, a network administrator can assign SSID(s) and password(s) for network 108 without being concerned with whether they are user-friendly. For instance, a network administrator can randomly generate a 16-character string (or some other length) to use as an SSID and a 32-character string (or some other length) to use as a password and can assign a user-friendly screen name (e.g., "HotelGuest"). The user of wireless device 104 can see and interact with the screen name while wireless device 104, transparently to the user, uses the SSID and password. In addition, where the SSID is dynamic, use of a screen name can help the user recognize the network without needing to know the current SSID.

Dynamic SSID generation, where used, can further allow the network operator to "obscure" the network's identity. If the network name changes frequently and in a difficult-to-guess manner, persons detecting a broadcast of the name may be unable to associate the name with a geographic location. Thus, for instance, if wireless device 104 broadcasts a dynamic SSID in search of network 108, any other device that hears the broadcast will not be able to extract meaningful information from the SSID.

For networks using static SSID and/or password, the network administrator can from time to time change the SSID and/or password for wireless network 108. Provided that wireless devices 104 of authorized users have repeated access to credential source 106, wireless devices 104 can obtain new information from credential source 106 in connection with a past or planned change.

By way of example, suppose that wireless network 108 is established for a hotel to provide wireless Internet access for users staying at the hotel. The hotel operator can provide credential source 106, for example, as a docking device (e.g., clock radio or the like) in each guest room. Guests can dock their wireless devices 104 to credential source 106 whenever they are in the room to obtain network information record 120 including network access information 110. Once the information is obtained, wireless device 104 can use that information to access the hotel's network 108. If the network access information (e.g., SSID and/or password) changes, the user can dock wireless device 104 again to receive the update. In some embodiments, wireless device 104 can obtain updated network access information in advance for future planned changes; as described below, usage policy 122 can be used to indicate when the information is valid. Accordingly re-docking to obtain updates may not be necessary.

Some embodiments may provide additional features related to privacy and/or security. For instance, in an environment such as a hotel, a password can be assigned per room; the user can obtain the password via a docking device or other in-room device as described above. The hotel network operator can set the password for a given room to expire at a time based on the end of the current occupant's stay, after which a different password can be issued to the next guest to occupy the room. As another example, some base stations may support multiple SSIDs. In an environment such as a hotel, different SSIDs from a pool of operative SSIDs can be assigned to different users (e.g., per guest room or per floor or randomly), and the SSIDs can be changed from time to time.

Figure 3:
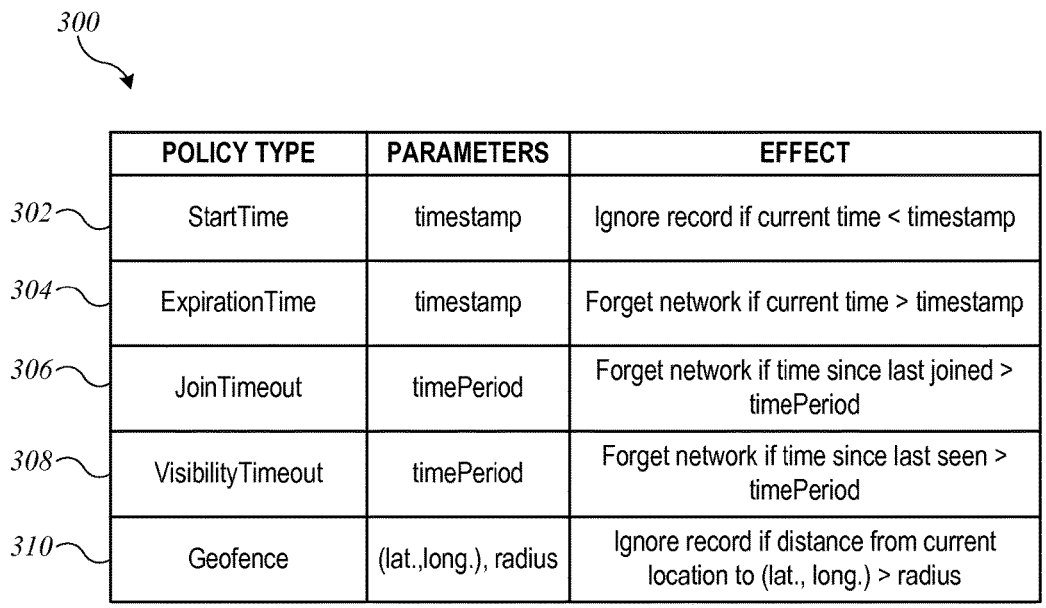
FIG. 3 shows a table listing examples of policy types that can be included in a usage policy for a wireless network according to an embodiment of the present invention.

According to certain embodiments of the present invention, other enhancements can be provided by associating a usage policy 122 with network access information 110 in network information record 120. Usage policy 122 can specify a set of one or more conditions under which wireless device 104 should attempt to use network access information 110 to join network 108. FIG. 3 shows a table 300 listing examples of policy types that can be included in usage policy 122 according to an embodiment of the present invention. It is to be understood that the various policy types are not mutually exclusive and that a usage policy for a given wireless network can include any combination of one or more policy types, including any of the policy types in table 300 as well as others not expressly shown.

A "StartTime" policy type 302 can be used to set an earliest time at which wireless device 104 should attempt to join network 108. A specific start time can be specified as a timestamp in any format readable by wireless device 104. Wireless device 104 can implement a StartTime policy by ignoring network information record 120 during any search for wireless networks prior to the start time. Thus, prior to the start time, wireless device 104 would not broadcast the SSID for wireless network 108 or attempt to join if it detects a beacon from wireless network 108. In some instances, a network operator can provide advance notice of future changes to network access information 110 by distributing network information records 120 with a start time set to the time the change will occur. As another example, access information for a hotel's wireless network can be provided to a future guest in advance of the stay, e.g., at the time of booking. Where this is the case, the start time can be set to coincide with the guest's scheduled arrival date.

An "ExpirationTime" policy type 304 can be used to set a latest time after which wireless device 104 should stop attempting to join network 108. A specific expiration time can be specified as a timestamp in any format readable by wireless device 104. Wireless device 104 can implement an ExpirationTime policy by ignoring network information record 120 during any search for wireless networks after the expiration time. Thus, after the expiration time, wireless device 104 would not broadcast the SSID for wireless network 108 or attempt to join if it detects a beacon from wireless network 108. In some embodiments, wireless device 104 can be configured to forget wireless network 108 after its expiration time, e.g., by removing network information record 120 from storage or invalidating it. In some instances, expiration times can be used in connection with scheduled changes to network access information 110 (so devices can discontinue using or storing stale information). As another example, for network information given to a hotel guest, the expiration time can be set to coincide with the guest's scheduled departure date.

A "JoinTimeout" policy type 306 can be used to specify that wireless device 104 should stop attempting to access wireless network 108 using network information record 120 if it has not successfully joined wireless network 108 within a timeout period. The timeout period can be specified as a time interval (e.g., 24 hours, one week, one month). Wireless device 104 can store information indicating the last time it joined wireless network 108 and can use that stored information to determine whether the timeout period has elapsed. If so, then in any subsequent network search, wireless device 104 would not broadcast the SSID for wireless network 108 or attempt to join if it detects a beacon from wireless network 108. In some embodiments, wireless device 104 can be configured to forget wireless network 108 after the timeout occurs, e.g., by removing network information record 120 from storage or invalidating it.

A "VisibilityTimeout" policy type 308 can be similar to JoinTimeout policy type 306, except that in this case the timeout period is defined based on the last time wireless device 104 detected the presence of wireless network 108 during a search, regardless of whether wireless device 104 joined network 108 at that time. Wireless device 104 can store information indicating the last time it detected wireless network 108 and can use that stored information to determine whether the timeout period has elapsed. If so, then in any subsequent network search, wireless device 104 would not broadcast the SSID for wireless network 108 or attempt to join if it detects a beacon from wireless network 108. In some embodiments, wireless device 104 can be configured to forget wireless network 108 after the timeout occurs, e.g., by removing network information record 120 from storage or invalidating it.

A "Geofence" policy type 310 can be used to specify that wireless device 104 should only attempt to access wireless network 108 when it is within a specified geographic area, also referred to as a geofence. The geofence can be defined, e.g., by specifying a central location in standard coordinates (e.g., latitude and longitude) and a radius; other definitions can be used. When commencing a search for wireless networks, wireless device 104 can determine its current location (e.g., using an onboard GPS receiver or the like) and can determine whether the location is inside or outside the geofence. If outside the geofence, then wireless device 104 would not broadcast the SSID for wireless network 108 or attempt to join if it detects a beacon from wireless network 108. If inside the geofence, then wireless device 104 can broadcast the SSID for wireless network 108 and can attempt to join it if it detects a beacon or response to the signal. In some embodiments, a network operator can define a geofence to include the geographic area within signaling range of wireless network 108, so that wireless device 104 does not look for network 108 when it is probably out of range.

In some embodiments, usage policy 122 for a given wireless network can incorporate multiple policy types. For instance, a usage policy can specify a start time, an expiration time, and a geofence. Wireless device 104 can implement the policy, e.g., by attempting to join wireless network 108 only between the start time and the expiration time and only if wireless device 104 is inside the geofence.

It should be understood that usage policy 122 is intended to be implemented by the wireless device, and it is not required that the network operator or base station 102 do anything to enforce usage policy 122. For example, the SSID and password included in network information record 120 may be valid before the start time and/or after the expiration time, and base station 102 need not know the location of wireless device 104 when it attempts to join network 108 (although by definition, base station 102 would only know of such an attempt if wireless device 104 is within range of network 108). In some embodiments, usage policy 120 can be designed to protect the privacy of wireless device 104 and its user, particularly if network 108 is a hidden network. By applying a policy to limit when and/or where wireless device 104 should attempt to join network 108, wireless device 104 can limit its broadcasting of information about any particular network to conditions under which there is at least some possibility of finding that network. This can reduce the information wireless device 104 inadvertently exposes to third parties, thereby enhancing user privacy.

Further, a usage policy can be implemented for any wireless network, regardless of whether the network has a static or dynamic SSID (or password), or regardless of whether the SSID (or password) is chosen to be user-friendly.

It should also be noted that credential source 106 can provide different usage policies 122 for the same network 108 to different wireless devices 104. For example, in the case of a network operated by a hotel, each guest can receive a usage policy with start time and/or end time based on that guest's arrival and/or departure dates.

In some embodiments, usage policy 122 can be provided separately from the network access information (e.g., SSID and password) for network 108. For example, usage policy 122 can be included in a beacon from a base station of network 108 while access information is provided through a different (and more secure) channel, such as credential source 106, manual data entry by the user, or other channels. Provided that usage policy 122, by itself, does not provide information enabling a device to join network 108, broadcasting usage policy 122 need not compromise network security. Wireless device 104 can associate usage policy 122 included in a beacon with the network identified by the beacon and with any access credential wireless device 104 has for that network. Thus, different portions of network information record 120 for a given network 108 can be obtained from different sources.

Figure 4:
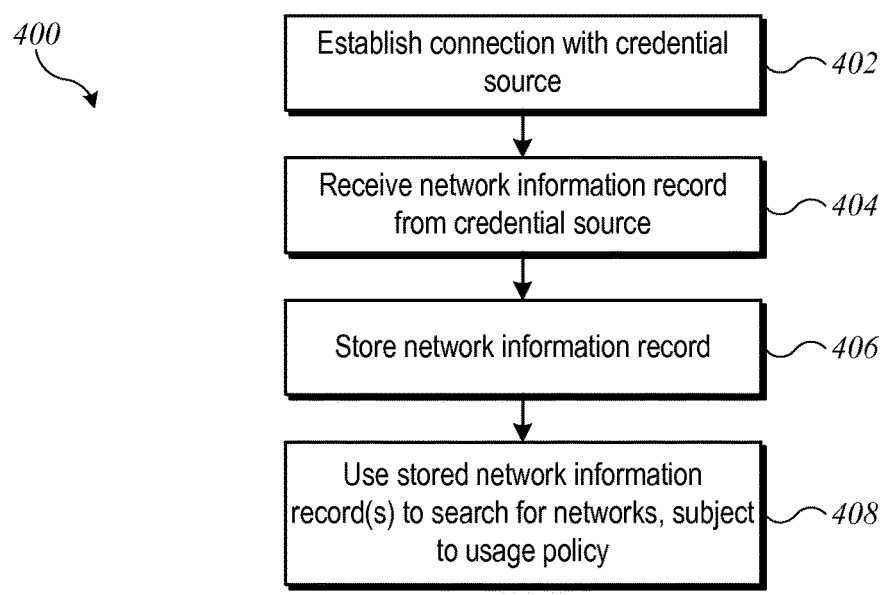
FIG. 4 shows a flow diagram of a process for connecting to wireless networks according to an embodiment of the present invention.

Examples of operation of wireless device 104 using network information record(s) 120 will now be described. FIG. 4 shows a flow diagram of a process 400 for connecting to wireless networks according to an embodiment of the present invention. Process 400 can be implemented, e.g., in wireless device 104 of FIG. 1.

Process 400 can begin at block 402, when wireless device 104 establishes a connection with a credential source, e.g., credential source 106 described above. The connection can be, e.g., a wired connection, wireless connection, or the like. At block 404, wireless device 104 can receive network information record 120 from credential source 106. Network information record 120 can be transmitted as a formatted data object in any format wireless device 104 is capable of reading and interpreting (e.g., XML, JSON, or other syntax for formatted data objects can be used). As described above, network information record 120 can include network access information 110 and usage policy 120. At block 406, wireless device 104 can store network information record 120, e.g., in known networks data store 130. At block 408, which can be performed at any time after block 406, wireless device 104 can use stored network information record 120 to search for wireless networks, subject to any usage policy 122 included therein. Specific examples of processes that can be implemented at block 408 are described below.

It will be appreciated that process 400 is illustrative and that variations and modifications are possible. Steps described as sequential may be executed in parallel, order of steps may be varied, and steps may be modified, combined, added or omitted. For instance, in some embodiments, a network information record can be obtained without establishing a connection to the credential source; as noted above, network information records can be supplied via communication channels such as email or SMS or the like, which do not require a direct connection between the sender and recipient. As noted above, in some instances, the credential portion and the usage policy portion of a network information record can be obtained from different sources and/or at different times. It is also to be understood that not all network information records stored in a given wireless device need include a usage policy.

Further, as time passes, wireless device 104 can perform blocks 402-406 multiple times, with the same credential source and/or different credential sources, to accumulate multiple network information records. It is also not required that all network information records obtained by wireless device 104 be received via device-to-device data communication. For example, in some cases, a user may select a network to join and manually provide the access credential (if an access credential is required), and wireless device 104 can create a network information record based on the user input. Thus, wireless device 104 can, at any given time, have any number of known networks, and network information records representing known networks can be acquired using a combination of techniques.

At any given time, wireless device 104 can use its set of known networks (e.g., the set of stored network information records in data store 130) to search for and join a wireless network. In some embodiments of the present invention, wireless device 104 can limit its search based on usage policies for one or more of the known networks, such that a given known network is included in the search only if the usage policy for that network indicates that it should be included.

Figure 5:
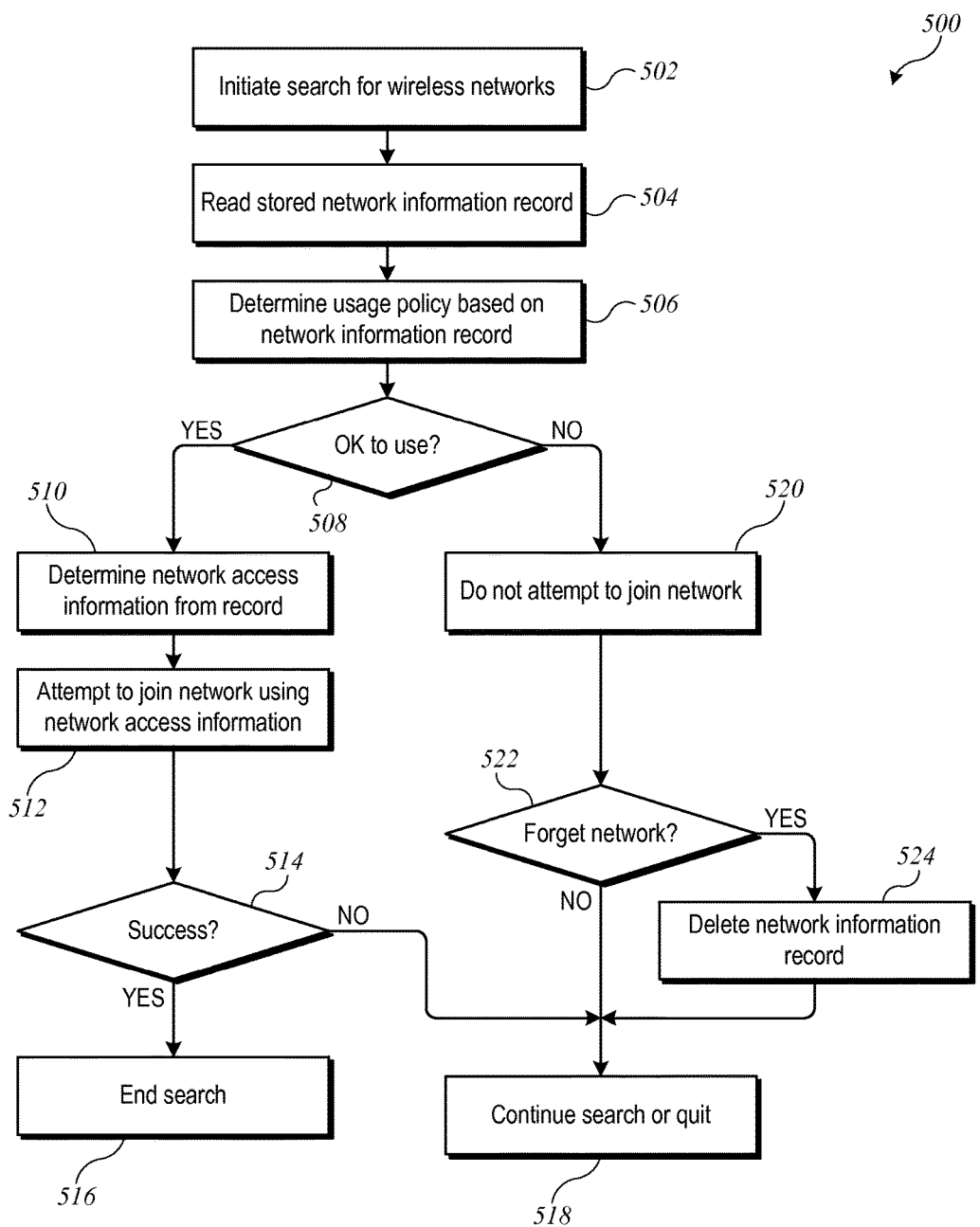
FIG. 5 shows a flow diagram of a process for searching for a wireless network according to an embodiment of the present invention.

FIG. 5 shows a flow diagram of a process 500 for searching for a wireless network according to an embodiment of the present invention. Process 500 can be implemented, e.g., in wireless device 104 of FIG. 1, and can be used, e.g., to implement block 408 of process 400 described above.

Process 500 can begin at block 502, when wireless device 104 initiates a search for wireless networks. In some embodiments, this can occur automatically under various conditions. For example, if a user requests an operation that requires access to a network (e.g., viewing a web page, retrieving email) and wireless device 104 is not currently connected to a wireless network, wireless device 104 can initiate a search. Or, wireless device 104 may periodically search for wireless networks whenever it is not connected to one. In some embodiments, the user can manually instruct wireless device 104 to initiate a search. Other events occurring in or detected by wireless device 104 can also trigger initiation of a search.

Regardless of the particular event(s) that trigger initiation of the search, at block 504, wireless device 104 can read a stored network information for a known network, e.g., network information record 120 as described above. At block 506, wireless device 104 can determine a usage policy based on the network information record read at block 504. For instance, network information record 120 may include usage policy 122 as described above. At block 508, wireless device 104 can determine, based on the usage policy, whether network information record 120 should be used in the search. It is to be understood that some network information records might not have a usage policy, and in that case, block 508 can always result in a determination that the network information record should be used.

Figure 6:
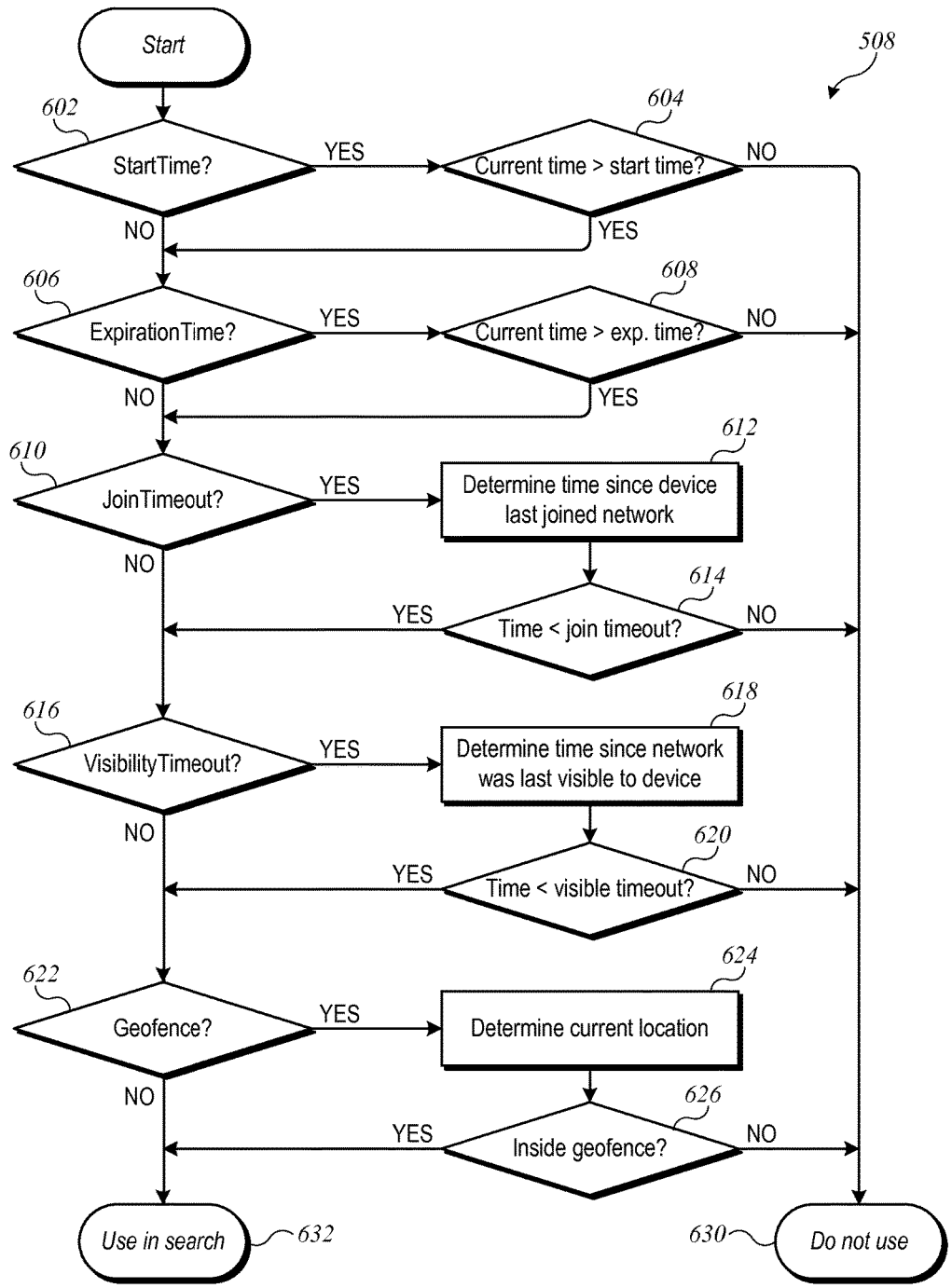
FIG. 6 shows a flow diagram of decision logic applying a usage policy according to an embodiment of the present invention.

For network information records 120 that include a usage policy, the particular decision logic can depend on the usage policy. FIG. 6 shows a flow diagram of decision logic that can be applied at block 508 of process 500 according to an embodiment of the present invention. In this example, it is assumed that a usage policy can include one or more of the policy types specified in table 300 of FIG. 3 and that the network information record should be used only when all conditions specified in all included policy types are satisfied.

At block 602, wireless device 104 can determine whether a StartTime policy has been set. If so, then at block 604, wireless device 104 can determine whether the current time is later than the start time. If not, then network information record 120 should not be used, and "do not use" decision (block 630) is the result.

If the current time is later than the start time, or if no start time is specified, then at block 606, wireless device 104 can determine whether an ExpirationTime policy has been set. If so, then at block 604, wireless device 104 can determine whether the current time is prior to the expiration time. If not, then network information record 120 should not be used, and "do not use" decision (block 630) is the result.

If the current time is prior to the expiration time, or if no expiration time is specified, then at block 610, wireless device 104 can determine whether a JoinTimeout policy has been set. If so, then at block 612, wireless device 104 can determine the elapsed time since it last joined the network associated with network information record 120. For instance, as described above, wireless device 104 can store information about previous connections to a network, and this stored information can be accessed at block 612. At block 614, if the elapsed time exceeds the join timeout period, then network information record 120 should not be used, and "do not use" decision (block 630) is the result.

If the join timeout period has not been exceeded, or if no join timeout period is specified, then at block 616, wireless device 104 can determine whether a VisibilityTimeout policy has been set. If so, then at block 618, wireless device 104 can determine the elapsed time since it last detected the network associated with network information record 120. For instance, as described above, wireless device 104 can store information about previous detections of a particular network (regardless of whether wireless device 104 joined the network at that time), and this stored information can be accessed at block 618. At block 620, if the elapsed time exceeds the visibility timeout period, then network information record 120 should not be used, and "do not use" decision (block 630) is the result.

If the visibility timeout period has not been exceeded, or if no visibility timeout period is specified, then at block 622, wireless device 104 can determine whether a Geofence policy has been set. If so, then at block 624, wireless device 104 can determine its current location, e.g., using an onboard GPS receiver or the like. For example, the current location can be determined as a bounded area within which the device is likely to be actually located (e.g., with the boundaries based in part on the quality of the data from the GPS receiver). If that area overlaps the geofence, the device can be considered to be inside the geofence; if not, the device can be considered to be outside the geofence. At block 626, if the current location is outside the geofence, then network information record 120 should not be used, and "do not use" decision (block 630) is the result. In some embodiments, the "inside" or "outside" determination for a geofence can be designed to take into account accuracy limitations of location determination.

If all of the conditions set by the usage policy are satisfied, decision logic 508 can result in a decision to use the network information record (block 632).

It will be appreciated that the decision logic of FIG. 6 is illustrative and that other decision logic can be substituted. In addition, while the process flow is shown as sequential, parallel logic can be substituted for some or all of the policy types and conditions. More or fewer policy types can be supported than the examples shown.

Figure 7:
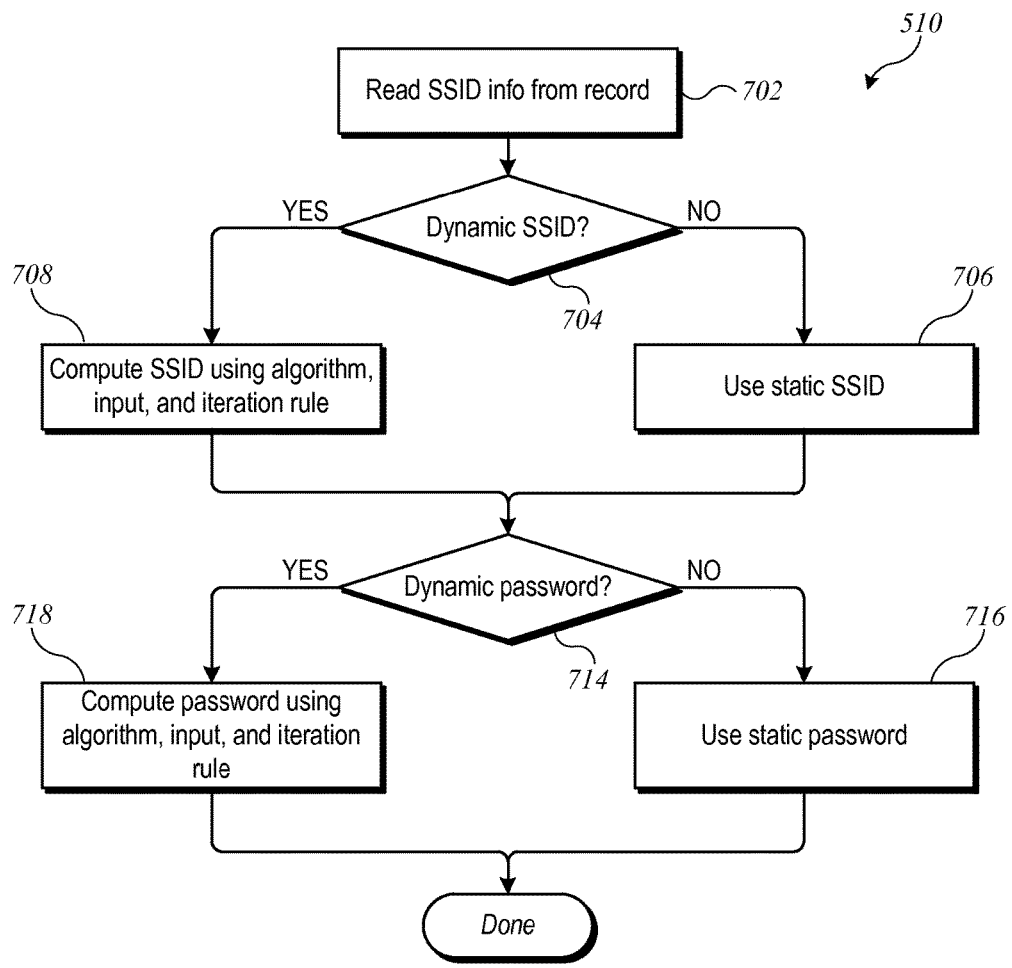
FIG. 7 shows a flow diagram of processing logic for determining network access information according to an embodiment of the present invention.

Referring again to FIG. 5, if, at block 508, the decision is made to use the network information record in the search, then at block 510, wireless device 104 can determine the network access information from the network information record, e.g., by reading network access information 110. In some embodiments, network access information 110 for a given network can include a network name (e.g., SSID) and access credential (e.g., password), either or both of which can be static or dynamic as described above.

Where these options exist, processing at block 510 can include processing the information stored in network information record 120 to generate network access information (e.g., SSID and password). FIG. 7 shows a flow diagram of processing logic that can be applied at block 510 according to an embodiment of the present invention.

At block 702, wireless device 104 can read SSID information from network access information 110 of network information record 120. In this example, the SSID can be either static or dynamic. At block 704, wireless device 104 can determine whether the SSID is static or dynamic. If the SSID is static, then at block 706, wireless device 104 can simply use the static SSID. If the SSID is dynamic, then at block 708, wireless device 104 can compute the current SSID using the instructions (e.g., algorithm, input, and iteration rule) specified in network access information 110. For instance, wireless device 104 can determine, form the current item and the iteration rule, how many iterations of the algorithm to perform. In some embodiments, each time wireless device 104 performs block 708 for a given network, it can store the result as a new input for the algorithm and change the start time specified in the iteration rule to the current time, thereby avoiding the need to repeat computations.

Once the SSID is determined, wireless device 104 can determine the password. More specifically, at block 714, wireless device 104 can read password information from network access information 110 of network information record 120. In this example, the password can be either static or dynamic, regardless of whether the SSID is static or dynamic. At block 714, wireless device 104 can determine whether the password is static or dynamic. If the password is static, then at block 716, wireless device 104 can simply use the static password. If the password is dynamic, then at block 718, wireless device 104 can compute the current password using the instructions (e.g., algorithm, input, and iteration rule) specified in network access information 110. For instance, wireless device 104 can determine, form the current time and the iteration rule, how many iterations of the algorithm to perform. In some embodiments, each time wireless device 104 performs block 718 for a given network, it can store the result as a new input for the algorithm and change the start time specified in the iteration rule to the current time, thereby avoiding the need to repeat computations. With the SSID and password determined, processing at block 510 can end.

Referring again to FIG. 5, at block 512, wireless device 104 can attempt to join a wireless network using the network access information determined at block 510. For example, if the network is a non-hidden network, wireless device 104 can perform a passive scan (or use a result of a recent passive scan) to find a network that is broadcasting a beacon with an SSID matching the SSID determined at block 510. If the network is a hidden network, wireless device 104 can perform an active scan, broadcasting its own beacon with the SSID determined at block 150 and listening for a response from a base station. If, at block 514, the attempt is successful, search process 500 can end. If not, search process 500 can continue at block 518, using network information records for any other known networks until such time as wireless device 104 determines that the search should end.

As described above, in some instances, block 508 can result in a determination that a particular network information record should not be used in the search. If this occurs, then at block 520, wireless device 104 does not attempt to join a network using the network information record in question. In some embodiments, if a determination is made not to use a particular network information record in a search, then at block 526, wireless device 104 can make a further determination as to whether to forget the corresponding network. This determination can be based on usage policy 122. For instance, in the case of a network information record for which the applicable expiration time has passed, there is no expectation that the record would be used in the future, and accordingly wireless device 104 can "forget" the network in question, e.g., by deleting (or invalidating) the network information record at block 524. On the other hand, in the case of a network information record for which wireless device 104 is outside the applicable geofence, it is possible that wireless device 104 may be inside the geofence at a future time, and accordingly, wireless device 104 can preserve the network information record.

Regardless of whether the network information record is preserved or deleted, at block 518, wireless device 104 can continue executing search process 500, using network information records for any other known networks. Search process 500 can continue until wireless device 104 either succeeds in joining a network or determines that the search should end. (Standard or other conditions for ending a wireless-network search can be applied as desired.)

It will be appreciated that the processes described herein are illustrative and that variations and modifications are possible. Steps described as sequential may be executed in parallel, order of steps may be varied, and steps may be modified, combined, added or omitted. For instance, wireless device 104 can search for multiple (or all) known networks in parallel, subject to applicable usage policies for various networks, and various prioritizing rules can be applied to select a preferred network in the event that multiple known networks are found. The process for searching can be applied regardless of how a particular network information record was obtained, and the application of usage policies can be transparent to the user. A user might notice that a particular network was not found, without knowing whether this was a result of a usage policy or some other condition (e.g., the network is offline).

In some embodiments, wireless device 104 can solicit user input in connection with searching for wireless networks. For instance, wireless device 104 can present a list of networks found in a scan and prompt the user to select a network to join, or wireless device 104 can prompt the user for confirmation prior to attempting to join a particular network. In cases where a network information record 120 for a particular network includes screen name 202, wireless device 104 can present screen name 202 to the user in addition to or instead of the SSID.

Figure 8:
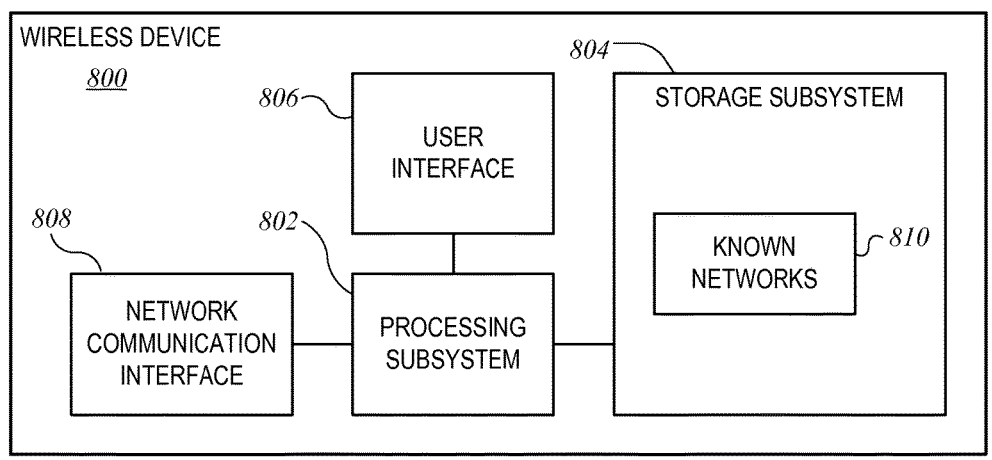
FIG. 8 is a simplified block diagram of a wireless device according to an embodiment of the present invention.

FIG. 8 is a simplified block diagram of a wireless device 800 according to an embodiment of the present invention. Wireless device 800 can implement any or all of the functions, behaviors, and capabilities described herein as being performed by a wireless device (e.g., wireless device 104 of FIG. 1), as well as other functions, behaviors, and capabilities not expressly described. Wireless device 800 can include processing subsystem 802, storage subsystem 804, user interface 806, and network interface 808. Wireless device 800 can also include other components (not explicitly shown) such as a battery, power controllers, and other components operable to provide various enhanced capabilities. In various embodiments, wireless device 800 can be implemented in a desktop or laptop computer, tablet computer, smart phone, other mobile phone, wearable device, media device, household appliance, environmental control device, security device, or any other device that is connectable to a wireless network.

Storage subsystem 804 can be implemented, e.g., using disk, flash memory, or any other non-transitory storage medium, or a combination of media, and can include volatile and/or non-volatile storage media. In some embodiments, storage subsystem 804 can store one or more application and/or operating system programs to be executed by processing subsystem 802, including programs to implement any or all operations described herein as being performed by a wireless device. For example, storage subsystem 802 can store program code for identifying, searching for, and joining wireless networks. This can include program code for obtaining a network information record from a credential source (e.g., implementing process 400 described above) and program code for searching for wireless networks subject to network-specific usage policies (e.g., implementing process 500 described above). Storage subsystem 804 can also store information useful for establishing network connections. For example, storage subsystem 804 can store a collection of network information records 810 for known networks (e.g., implementing known networks data store 130, which can include one or more instances of network information record 120 described above).

User interface 806 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 806 to invoke the functionality of wireless device 800 and can view and/or hear output from wireless device 800 via output devices of user interface 806.

Processing subsystem 802 can be implemented as one or more integrated circuits, e.g., one or more single-core or multi-core microprocessors or microcontrollers, examples of which are known in the art. In operation, processing subsystem 802 can control the operation of wireless device 800. In various embodiments, processing subsystem 802 can execute a variety of programs in response to program code and can maintain multiple concurrently executing programs or processes. At any given time, some or all of the program code to be executed can be resident in processing subsystem 802 and/or in storage media such as storage subsystem 804.

Through suitable programming, processing subsystem 802 can provide various functionality for wireless device 800. For example, in some embodiments, processing subsystem 802 can implement various processes (or portions thereof) described above as being implemented by a wireless device (including a portable wireless device). Processing subsystem 802 can also execute other programs to control other functions of wireless device 800, including programs that may be stored in storage subsystem 804. In some embodiments, these programs may control interactions with a base station (e.g., base station 102) and/or another wireless device, e.g., by generating messages to be sent to the base station or other wireless device and/or receiving messages from the base station or other wireless device. In some embodiments, these programs may control interactions with a credential source (e.g., credential source 106) to obtain a network information record 120.

Data communication interface 808 can provide voice and/or data communication capability for wireless device 800. In some embodiments, data communication interface 808 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth communication standards, NFC, etc.), and/or other components. In some embodiments, data communication interface 808 can provide wired connectivity (e.g., USB, Ethernet, UART, or the like) in addition to a wireless interface, which can facilitate docking with certain types of credential source devices. Data communication interface 808 can be implemented using a combination of hardware (e.g., driver circuits, antennas, modulators/demodulators, encoders/decoders, and other analog and/or digital signal processing circuits) and software components. In some embodiments, data communication interface 808 can support multiple communication channels concurrently, using the same transport or different transports.

It will be appreciated that wireless device 800 is illustrative and that variations and modifications are possible. A wireless device can be portable or non-portable as desired, and any number of wireless devices can be joined to a single wireless network. Wireless devices can have functionality not described herein (e.g., voice communication via cellular telephone networks; control mechanisms and/or interfaces for operating an appliance such as a thermostat or door lock; ability to interact with the user to provide personal information, play games, access content via the wireless network and/or locally stored content; etc.) and can include components appropriate to such functionality. In some embodiments, a wireless device might also incorporate base station functionality.

Further, while a wireless device is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Other electronic devices described herein can be implemented using similar technologies. For instance, base station 102 can be of conventional design or can be augmented with additional firmware and/or hardware to provide enhanced features such as dynamic generation of SSID(s) and/or password(s). In some embodiments, base station 102 can support multiple concurrently valid SSIDs and/or passwords. Credential source 106 can be any electronic device that is capable of communicating data to wireless device 104 via some communication channel, which can include direct channels (e.g., USB, UART, Bluetooth, NFC), indirect channels (e.g., a wired or wireless network configuration), or channels such as email or text messaging that do not require a connection.

While the invention has been described with respect to specific embodiments, one skilled in the art will recognize that numerous modifications are possible. For instance, although some examples described herein refer specifically to Wi-Fi networks and make use of terms such as "SSID" that may be associated with Wi-Fi networks, those skilled in the art with access to this disclosure will recognize that similar techniques can be applied in the context of other wireless network protocols and that the term "wireless network" should be understood as not being limited to Wi-Fi networks. An SSID can include any identifier assigned to a wireless network, and other types of access credentials can be provided in addition to or instead of a password.

Further, for purposes of illustration, reference is made above to wireless networks deployed in a specific type of environment, such as a hotel. This is merely for illustration, and the same techniques can be used in any wireless network regardless of where it is deployed. One such example includes a conference center, where, for example, the network manager can assign a different SSID and password for each event and make a credential source available to the event participants, e.g., at a registration table, near entrances to the conference venue, and/or in guest rooms at a hotel affiliated with the conference center. The usage policy for a network information record can include start time and/or expiration time based on the dates of the event. Another example includes a corporate environment where employees may have access to confidential information via a "private" wireless network. In this context, periodically changing network access information or defining network access information per-user or the like may be desirable as a security measure, and a credential source within the corporate environment can provide updated network information records to current employees from time to time. Yet another example includes a residential environment, where the residents may desire to obscure the association of a specific network name with their home while providing a user-friendly way for their own devices (or their friends' devices) to join the network.

As noted above, different network information records stored by a given wireless device can have different usage policies, and some may not have usage policies at all. When searching for networks, the wireless device can respect the individual usage policy of each network. In some instances, a wireless device can define a default usage policy for network information records that do not have one upon creation or receipt. For example, a wireless device can implement a default visibility timeout with a relatively long period (e.g., six months). The default policy might also distinguish between hidden and non-hidden networks. For instance, the visibility timeout can be applied for hidden networks only (e.g., to reduce the occurrence of the wireless device broadcasting that it knows the name of a particular network) while network information records for non-hidden networks can be preserved indefinitely.

Further, embodiments described above allow usage policies to be defined and applied transparently to the user; that is, the user need not know which of the networks known to the wireless device have an associated usage policy or what the policy is. In some embodiments, a user may wish to manually define or modify usage policies, and user interfaces can be provided to permit manual operations. For example, if the user manually selects a specific network to join, the device can present a prompt offering the user the option to establish a usage policy for the network when prompting the user to enter an access credential or immediately after joining the network. Control interfaces for defining or modifying usage polices can also be incorporated into settings menus or the like on the wireless device. In some embodiments, usage policies are intended to protect user privacy (not necessarily to protect the network itself), and in that context it may be desirable to allow users to modify usage policies set by a network provider.

In some embodiments, a user may have multiple devices for which access to a particular wireless network is desirable. For instance, a user staying at a hotel may have a smart phone and a laptop computer, both of which may benefit from access to a wireless network. In some embodiments, network information records obtained by one of the user's devices can be synchronized to other devices belonging to the same user, so that it is not necessary for each user device to communicate with the credential source. Synchronization of network information records can use techniques similar to techniques used for securely storing and synchronizing manually entered passwords or other data among user devices; local and/or cloud-based synchronization techniques can be supported as desired.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method executed in a wireless device, the method comprising:

obtaining a first network information record for a first wireless network, the first network information record including network access information for the first wireless network and a usage policy specifying a condition under which the first network information record should be used, wherein the network access information for the first wireless network includes instructions for dynamically generating a network name for the first wireless network using an algorithm and further includes an input parameter to initialize the algorithm;

storing the first network information record in a set of network information records for known networks; and searching for a wireless network to join, using the set of network information records, wherein searching for a wireless network to join includes:

determining, based on the usage policy of the first network information record, whether the condition is satisfied; and searching for the first wireless network only if the condition is satisfied, wherein searching for the first wireless network includes executing the algorithm to dynamically generate the network name of the first wireless network and using the dynamically-generated network name to detect the first wireless network.

2. The method of claim 1 wherein the usage policy specifies that the first network information record should be used only after a start time specified in the usage policy.

3. The method of claim 1 wherein the usage policy specifies that the first network information record should not be used after an expiration time specified in the usage policy.

4. The method of claim 3 further comprising:
after the expiration time, removing the first network information record from the set of network information records for known networks.

5. The method of claim 1 wherein the usage policy specifies that the first network information record should be used only until a timeout condition occurs, the timeout condition being based on one or more of:
elapsed time since the first wireless network was last joined by the wireless device exceeding a join timeout period specified in the usage policy; or
elapsed time since the first wireless network was last visible to the wireless device exceeding a visibility timeout period specified in the usage policy.

6. The method of claim 5 further comprising:
after the timeout condition occurs, removing the first network information record from the set of network information records for known networks.

7. The method of claim 1 wherein the usage policy specifies that the first network information record should be used only when the device is inside a geofence specified in the usage policy.

8. The method of claim 1 wherein obtaining the first network information record includes:
establishing a secure communication channel with a credential source device; and
receiving the first network information record via the secure communication channel.

9. The method of claim 8 wherein the secure communication channel is a wired communication channel.

10. The method of claim 1 wherein the network access information further includes instructions usable by the wireless device to dynamically generate an access credential for the first wireless network and wherein the method further comprises, in the event that the first wireless network is found in the search:
dynamically generating an access credential using the instructions; and
providing the access credential to the wireless network.

11. The method of claim 1 further comprising:
determining an access credential based on the network access information in the first network information record; and
using the access credential to join the first wireless network in the event that the first wireless network is found in the search.

12. The method of claim 1 wherein searching for a wireless network to join includes broadcasting a network name determined based on the network access information in the first network information record.

13. An electronic device comprising:
a data communication interface to communicate with a wireless network;
a storage medium to store a set of network information records for known networks; and
a processor coupled to the data communication interface and the storage medium, the processor configured to:
obtain a first network information record for a first wireless network, the first network information record including network access information for the first wireless network and a usage policy specifying a condition under which the first network information record should be used, wherein the network access information for the first wireless network includes instructions for dynamically generating one or both of a network name or an access credential using an algorithm and further includes an input parameter to initialize the algorithm;
store the first network information record in the set of network information records for known networks; and
search for a wireless network to join, using the set of network information records, wherein searching for a wireless network to join includes determining, based on the usage policy of the first network information record, whether the condition is satisfied, and searching for the first wireless network only if the condition is satisfied, wherein searching for the first wireless network includes executing the algorithm to dynamically generate one or both of the network name or the access credential and using the dynamically-generated network name or access credential to detect the first wireless network.

14. The electronic device of claim 13 wherein the usage policy specifies that the first network information record should be used only after a start time specified in the usage policy.

15. The electronic device of claim 13 wherein the usage policy specifies that the first network information record should not be used after an expiration time specified in the usage policy.

16. The electronic device of claim 13 wherein the usage policy specifies that the first network information record should be used only until a timeout condition occurs, the timeout condition being based on one or more of:
elapsed time since the first wireless network was last joined by the electronic device exceeding a join timeout period specified in the usage policy; or
elapsed time since the first wireless network was last visible to the electronic device exceeding a visibility timeout period specified in the usage policy.

17. The electronic device of claim 13 wherein the usage policy specifies that the first network information record should be used only when the device is inside a geofence specified in the usage policy.

18. The electronic device of claim 13 wherein the data communication interface includes a wired communication interface and wherein the processor is further configured to:
establish a secure communication channel with a credential source device; and
receive the first network information record via the secure communication channel.

* * * * *